UNITED STATES PATENT OFFICE.

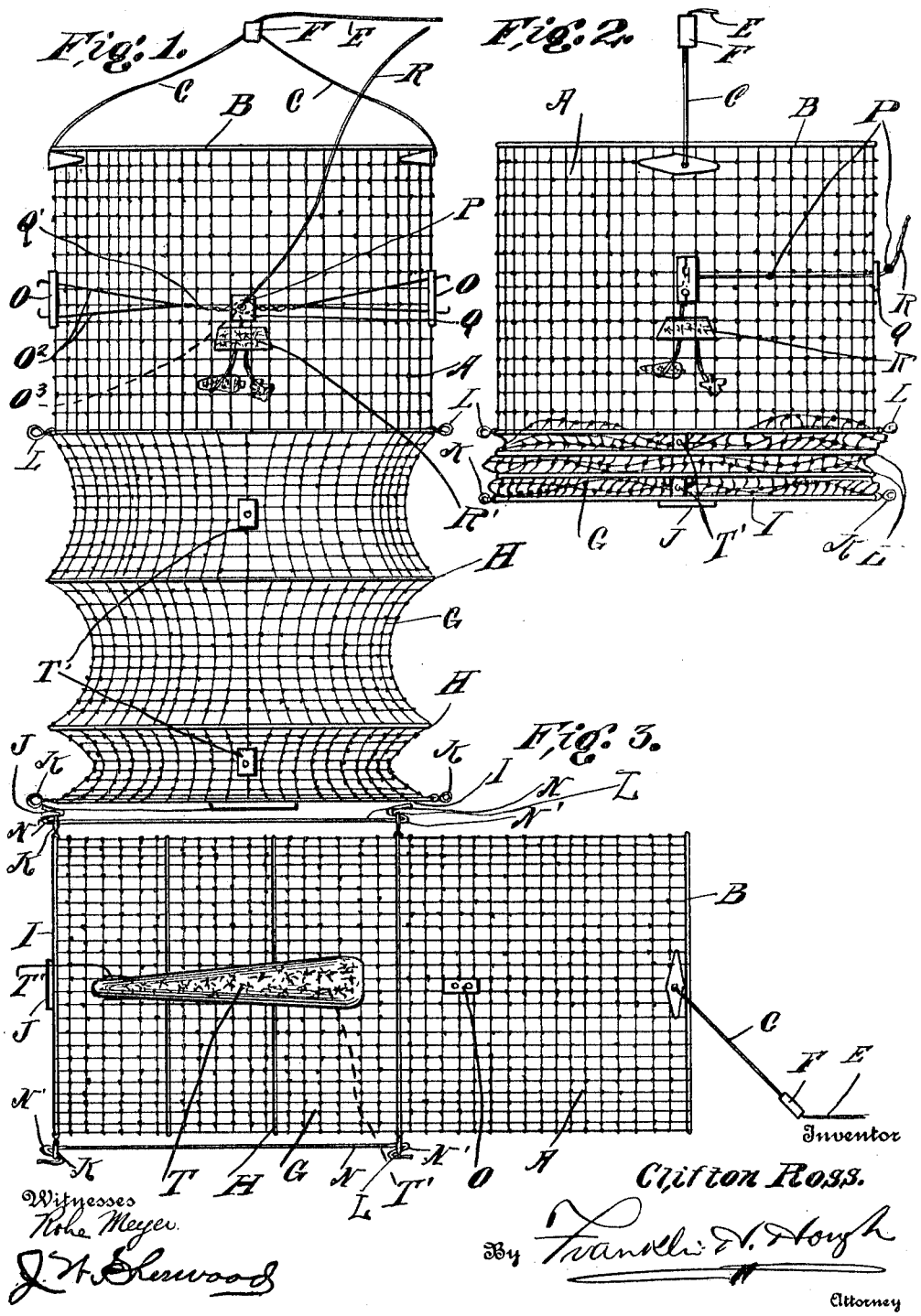

CLIFTON ROSS, OF UTICA, MISSISSIPPI, ASSIGNOR OF ONE-HALF TO WILLIAM B. POWELL, OF UTICA, MISSISSIPPI.

FISH-TRAP.

1,106,318. Specification of Letters Patent. Patented Aug. 4, 1914.

Application filed February 10, 1914. Serial No. 817,891.

*To all whom it may concern:*

Be it known that I, CLIFTON ROSS, a citizen of the United States, residing at Utica, in the county of Hinds and State of Mississippi, have invented certain new and useful Improvements in Fish-Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in fish traps and comprises the construction of a simple and efficient trap of this character, having various details of construction and arrangement of parts which will be hereinafter fully described and then specifically defined in the appended claim.

The invention is clearly illustrated in the accompanying drawings, which, with the letters of reference marked thereon form a part of this specification, and in which drawings;

Figure 1 is a side elevation of my trap, which is shown as partially collapsed. Fig. 2 is a view showing the trap collapsed, and Fig. 3 is a side elevation, showing the different adjustments of the trap.

Reference now being had to the details of the drawings by letter, A designates a cylindrical portion of the trap, which may be constructed of any suitable meshwork of wire and is provided with a ring B at the outer open margin thereof and to which ring or margin the cords C are fastened at their inner ends, which cords are at their outer ends and fastened to a cord E, thus forming means whereby the trap may be raised and lowered in the water. In order that the cords may not fall into the trap when adjusted in place in the water, a weight F is fastened to the cords at any suitable location, preferably at a point of connection of the cords to each other. By the provision of the said weight, it will be noticed that when the cord E is lowered into the water, the weight will cause the ends of the cords to which the weight is fastened to fall outside of the trap, thus insuring said cords being out of the way of fish which might enter the trap. It will upon having reference to the drawings, be noted that the portion of the trap which is collapsible and which portion is designated by the letter G, is provided with a plurality of rings H which serve to hold the collapsible portion of the trap extended.

The bottom of the trap is designated by the letter I, and is composed of a meshwork of wire with a weighted member J fastened thereto, while at points diametrically opposite upon said bottom, from the eyes K, other eyes designated by the letter L, are positioned upon the fixed or rigid portion of the trap, and rods N having hooked ends N' are adapted to engage said eyes, in the manner shown in Fig. 3 of the drawings, for the purpose of holding the collapsible portion of the trap distended.

Apertured plates, designated by the letter O are fastened to the cylindrical portion of the trap and a cross-rod O' has branching arms $O^2$, with hooked ends for engagement with the apertures in said plates, and an eye $O^3$ is provided at any suitable location, preferably near the middle of said cross rods, and through which a cord R passes, which cord is fastened at one of its ends to the member R', to which a bait is adapted to be fastened. Other plates T' have cords $T^2$ connecting the same and to which bait is adapted to be fastened. Said cord R passes through an aperture Q, formed in a plate Q' which is fastened to the cylindrical portion of the cage, and knots P are formed in said cord R and are adapted to limit the movement of the said cord R through the aperture Q.

A float T is adapted to be fastened to the rings H, which are secured to and spaced apart from each other, upon the collapsible portion of the trap, said float being adapted for use when the application or use of the trap in the manner shown in Fig. 3 of the drawings is made, a purpose of the float being to hold the trap in a horizontal position.

When the trap is adapted for use in certain kinds of fishing, as illustrated in Fig. 2 of the drawings, the lower portion of the trap is collapsed, and when there is evidence of a fish nibbling at the bait, which will cause the cord fastened to the bait carrying-member to be moved, the trap W may be drawn out of the water, by means of the cord E.

When the trap is adjusted for use as shown in Fig. 3, the cross-piece shown in Fig. 1 and which holds the bait-carrying member, is removed and the trap may be utilized as a scoop net.

In adjusting the trap for fishing, when it is desired to hold the trap distended, the trap is positioned horizontally, as is shown in Fig. 3, the trap being held in its distended position by means of the rods which have hooks at their ends and which engage the eyes formed in one of said rings to the marginal edge of the bottom of the trap, a suitable float being provided to hold the trap in its proper position.

Having thus described my invention, what I claim to be new is—

A fish trap having a noncollapsible cylindrical portion of open wire meshwork, and a collapsible portion with a bottom of open meshwork, means for raising and lowering the trap, a cross-rod detachably fastened at its ends to the cylindrical portion of the trap at points diametrically opposite each other, said rod having an eye therein, a cord movable through said eye, a bait-carrying member secured to said cord and means for limiting the movement of said cord, substantially as set forth.

In testimony whereof I hereunto affix my signature in presence of two witnesses.

CLIFTON ROSS.

Witnesses:
C. M. BUTLER,
J. G. LEASH.

Copies of this patent may be obtained for five cents each, by addressing the "Commissioner of Patents, Washington, D. C."